United States Patent [19]

Funk et al.

[11] 4,142,969

[45] Mar. 6, 1979

[54] COMPOSITION AND PROCESS FOR SELECTIVELY REMOVING OLEAGINOUS PRODUCTS FROM WATER

[76] Inventors: Richard S. Funk, 2785 St. James Pl., Altadena, Calif. 91001; Donald W. Mogg, 407 Avenue G, Redondo Beach, Calif. 91001; David L. Ruff, 2304 W. 233rd St., Torrance, Calif. 90501

[21] Appl. No.: 557,688

[22] Filed: Mar. 12, 1975

Related U.S. Application Data

[63] Continuation-in-part of Ser. No. 144,257, May 17, 1971, abandoned.

[51] Int. Cl.$^2$ ............................................. C02B 9/02
[52] U.S. Cl. ...................................... 210/36; 210/40; 210/502; 210/DIG. 26
[58] Field of Search ............ 210/36, 40, 502, DIG. 21, 210/DIG. 26

[56] References Cited

U.S. PATENT DOCUMENTS

| | | | |
|---|---|---|---|
| 3,382,170 | 5/1968 | Pape | 210/40 |
| 3,414,511 | 12/1968 | Hitzman | 210/40 |
| 3,464,920 | 9/1969 | Pirson et al. | 210/40 |
| 3,536,615 | 10/1970 | Bunn | 210/502 |
| 3,589,844 | 6/1971 | Kraemer et al. | 210/40 |
| 3,607,741 | 9/1971 | Sohnius | 210/40 |
| 3,630,891 | 12/1971 | Peterson et al. | 210/36 |
| 3,855,152 | 12/1974 | Preus | 210/36 |

*Primary Examiner*—Thomas G. Wyse
*Attorney, Agent, or Firm*—Fidelman, Wolffe & Waldron

[57] ABSTRACT

This invention relates to a composition and method of removing oleaginous compounds from aqueous systems, both fresh and salt, by employing a composition comprising a volcanic glass and a fibrous material.

2 Claims, No Drawings

COMPOSITION AND PROCESS FOR SELECTIVELY REMOVING OLEAGINOUS PRODUCTS FROM WATER

This application is a continuation-in-part of copending application Ser. No. 144,257, filed May 17, 1971 and now abandoned.

The invention relates to an oleospecific composition capable of sorbing oil substantially to the exclusion of water which comprises a substantially homogeneous physical mixture of cellulosic fibers and an expanded mineral silicate, like perlite.

It is an important object of the present invention to provide a product for recovering hydrocarbon liquids and particularly oil spills from water. Another object is to provide a layer zone of the product of the invention which selectively sorbs and retains oil when floating at the interface of oil and water.

It is another important object of the invention to provide a method for removing oil from water which permits the subsequent recovery of the oil and or of the water in useable form, if desired.

Other objects will become apparent from the further description of the invention.

It is known from U.S. Pat. 3,382,170 to Pape to remove an oily film from a body of water with expanded silicone-coated mineral perlite. The siliconizing treatment is reported by Pape to be superior to the treatment of expanded perlite with bituminous materials, because this latter treatment is stated to lower the absorptive capacity, the rate of capillary attraction and, indeed, also to reduce the effective surface area of the perlite particles. Likewise, the mechanical incorporation of metal soaps and the like has been stated to be similarly deficient.

Other materials have been suggested for removing oil films from a body of water. Absorbing materials recommended for this purpose should be, it is believed, in a moderately divided granular or fibrous state and should have relatively fine capillaries or cellular formations throughout the particles. The liquid can be absorbed and drawn into the particles by virtue of the surface forces of the liquid under the well-known principle of capillary action. Some of the porous materials suggested heretofore to remove oils from bodies of water include kieselguhr (diatomaceous earth), peat fibers, sawdust, straw and the like. However, while these materials are operable to a certain extent, there are inherent disadvantages to the use of porous substances. An important disadvantage includes the indiscriminate capillary attraction of the particles for water as well as for the oily substance, so that a large part of the absorbent capacity of the particle can be consumed by such water and is then unavailable for picking up the oil. This phenomenon also characterizes the so-called uncoated and expanded minerals such as perlite which is known for its large absorption capacity per unit weight and volume of the mineral. The expanded perlite can, for example, be saturated with water thereby rendering a large part of its capacity unavailable since it is covered with water.

Also a disadvantage of the traditional absorbents is that when the particle retains oil, there is a tendency to release the oil and replace it with water, thereby contaminating precisely that region in which the presence of oil makes the use of the absorbent necessary. An important drawback of expanded perlite is that although it has an exceptionally large effective surface area and a rough or discontinuous configuration thereby making the perlite mass highly porous, as well as having an exceptionally high retentivity of absorbed liquid and capability to absorb liquids rapidly, it cannot in its normal state absorb oil if it has previously been brought into contact with water. Accordingly, it has been attempted to make the expanded perlite hydrophobic while increasing its oleophilic character, as disclosed by U.S. Pat. No. 3,382,170 to Pape. These same problems occur with vermiculite.

It has also been suggested to use material like magnesite, dolomite, serpentine, olivine, asbestos and other like materials and asbestic rock especially fibers of serpentine chrysotile, these materials being insoluble or only sparingly soluble in water. However, it can be seen from Hitzman in U.S. Pat. No 3,414,511 that these materials require considerable agitation of the aqueous system. Other materials that have been suggested tend to sink before or after absorbing the oil from the water. This is particularly the case with fibrous materials like straw.

It is noteworthy that a review of the prior art teaches that it appears essential that the material used for removing an oil film from a body of water have adequate open spaces between the particles so that the liquid to be absorbed is drawn into the particles by virtue of the surface forces and the surface tension of the liquid under the well-known principle of capillary action. Thus, expanded perlite has been deemed to be particularly effective because it has an exceptionally large effective surface area and a rough or discontinuous configuration. It would not be expected therefore that a material in which the cavities between the granular expanded perlite particles are occupied by the cellulosic fibers would have the exceptionally high selective sorption for oils as the material of the present invention.

It is also apparent from a review of the prior art that considerable emphasis for oil recovery from water has been in the use of mineral preferably made hydrophobic and oleospecific. The prior art has generally avoided the use of hydrophilic materials, such as most vegetable fibers like cellulosic fibers. These materials would tend to absorb water in preference to the oil. Furthermore, the absorption of the water would tend to dislocate any air entrapped in the cellulosic fibers, causing the fiber to sink. This will also be very objectionable, since an important aspect of the recovery of the oil floating on the surface of the water is the necessity of contacting the oil with the material used and maintaining it on the surface of the water of efficient recovery of the oil-soaked material.

It is also evident from the teaching of the prior art that even in the more recent developments where expanded perlite is recommended, it has been found necessary because of the short-comings of untreated perlite, to treat it to render it hydrophobic. This is shown by the Pape patent discussed above, which uses a silicone.

It is an object of this invention to provide a composition comprising a specific volcanic glass and vegetable fibers, like cellulosic fibers, both of which are normally non-selectively oleophilic and hydrophilic, to sorb selectively oil from water. The composition of this invention is characterized further by having essentially spheroidal spaces or voids and elongated spaces, the former in the expanded perlite or like volcanic glass and the latter with the cellulosic fibers. The present composition is capable of selectively sorbing oil from water and floating at the interface of the two liquids essentially indefinitely.

From a study of the prior art it could not be fore-told that such a composition could be selectively oleospecific while being hydrophobic to the extent of being capable of sorbing the oil without sinking beneath the surface of the water. The composition of the present invention, therefore, has to exhibit and maintain the tenuous balance between the desirable characteristics needed for effectively removing oil from the surface of water. Even on extended exposure to sea water, even in rough weather and waves, the composition of this invention floats on the water. Its capacity to sorb oil from a body of water is remarkable when compared to that of the compositions of the prior art, while still being capable of floating on the surface of the water for essentially indefinite periods.

It has been found, that the combination of cellulosic fibers and expanded volcanic glass employed in the composition of the present invention is capable of sorbing a surprisingly and unexpectedly large amount of oil. It appears that the particular combination operates synergistically to sorb more than would be expected were the effects merely additive to character.

Volcanic glass suitable for use in the composition of the invention comprises perlite and pumice including pumicite and obsidian.

The mineral is used in its expanded form as a light fluffy material, generally referred to herein as expanded, also called popped, exfoliated, flake or activated. The term "perlite", which is the preferred embodiment of volcanic glass, is used herein in a generic sense to include perlitic vesiculating materials generally. These materials are known materials.

Another essential component of the composition of the invention is a cellulosic fibrous material, including newprint, kraft, cotton linters, bagasse, flax, linen, excelsior, and the like. The behavior of cellulose relative to humidity and water is highly complex. Cellulose in both native and regenerated forms assumes a moisture content in equilibrium with that of its environmental atmosphere. This equilibrium moisture content depends upon temperature and relative humidity. At a given humidity level, the moisture content reached during loss is higher than that attained during gain (desorption and sorption).

Observations of the water absorption properties of cellulose show that this is a comparatively complex phenomenon. In the initial high slope region of the absorption occurrence, specific surface sorption is thought to take place on unbonded hydroxyl groups in the accessible regions. Later, in the presence of more water, swelling of the fiber is presumed to break hydrogen bonds between cellulose chains, thus liberating additional sorption sites. Also, additional water molecules are absorbed on the previously absorbed water molecules. The final stage of absorption of water by cotton fibers, for instance, may be treated as a process of solution of water in cellulose in the disordered regions, modified by the restrictions to swelling imposed on the system by the insoluble watered regions. See E. Kawal. J. Exp. Sci. 37, 181 (1959). The behavior of cellulose fibers in the presence of an interaction with the perlite, in a two phase liquid system (oil-water), is therefore that much more complex.

In the composition of the invention, it is highly desirable that not more than 35% of the fiber be −200 mesh size when tested by the method specified in TAPPI test method no. T233. Preferably, the size of the fibers ranges from −5 to +200 mesh size. All mesh sizes refer to U.S. standard sieve.

While a small amount of long fiber (vegetable or mineral), such as about 5 to 20% of the fiber component of the present composition, can also be distributed through the expanded volcanic glass, the long fiber is generally not as desirable as the short fiber because uniform distribution of the fiber throughout the composition is more readily attained with the shorter fiber. In this sense, long fiber means a fiber of greater than 4mm length.

Although the inventors are not to be held to any particular theory or explanation for the invention, the composition of the invention and its remarkable effectiveness in selectively removing oil from the surface of water appears due to a feature of the composition of the invention, namely, that the vegetable fibers tend to lie mainly in the interstices between the granules of the expanded volcanic glass, such as perlite. The fibers within these interstices are maintained by the perlite particles in the form of an open network and thus are maintained both against segregation and agglomeration. The volcanic glass particles provide such a fine grained texture as to leave no large voids where a substantial large number of fibers could collect and block the voids and interfere with the free flow of water.

It is a noteworthy aspect of the composition of this invention that it is a product which is principally an expanded volcanic glass compounded with the fibers positioned principally between the particles of the expanded mineral to form a network or skeleton of fibers, rather than a product which is essentially fibers containing the expanded volcanic glass as a filler within the fibers.

The ratios by weight between the fiber and the expanded volcanic glass may vary with the nature and density of the fiber. The broadest ratio of expanded mineral, for instance, perlite, to fiber is a product wherein the mineral is present in the amounts of over 50% and preferably from 55 to 85% by weight whereas the fiber does not exceed 45% by weight and preferably is 10-40% by weight of the composition. In the most preferred ratios, the expanded mineral ranges from about 66 to 78%, whereas the fiber is from 17 to 29% by weight of the composition.

The perlite that is used in this invention is not limited to a particular size or to a specific range of sizes of the expanded perlite granules.

The product may be made from expanded perlite varying in size from coarse aggregate to finely milled material, as well as combinations of different sized particles. Generally, the expanded perlite will contain particles in the range of from −8 to +400 mesh.

Preferably, however, the expanded perlite used for the manufacture of the product should be of a grade such that a major portion (or at least a substantial portion) be capable of passing through a 14 mesh screen and being retained on a 200 mesh screen.

The fibrous component of this invention is treated by suitable means with a water repellent sizing, i.e., a material which renders the fibers hydrophobic. Suitable sizing materials to be used on the fibrous component are bitumens (such as asphalt or pitch), silicones, silanes and various waxes and resins, synthetic or natural. Particularly suitable is asphalt.

It is possible and frequently desirable to size, with the above defined water repellent material, the volcanic glass component in addition to the fibrous component. While the sizing (such as asphalt) is principally attracted to the fiber, a portion or excess thereof may serve to contribute to hold the fiber and the perlite together.

The amount of water repellent sizing to be used in the composition of the invention is about 0.001 to 20% by weight, preferably 0.5 to 15% by weight, and most preferably about 1 to 8 percent by weight. When asphalt, a very suitable material, is used, it is in amounts generally equal to or greater than 0.5%. All amounts are based on percentage by weight of the total composition of this invention.

The water repellent sizing discussed heretofore frequently and preferably acts also as a binder to help hold the fiber and volcanic glass together. However, it may be desirable to add specifically a binder in addition to the sizing. In such cases, there have been used 0 to 30%, and preferably 15-25% by weight of the composition.

Typical suitable binders are clays, such as bentonite (in particular, Wyoming bentonite — sodium montmorillonite), starch, inorganic resins such as sodium silicate and synthetic organic binders such as polyvinyl acetate.

The preparation of the composition of the present invention can be carried out by a suitable wet or dry method. In general, the selection of a wet or a dry process for making the product can be based on convenience or the ready availability of equipment and facilities.

According to an illustrative method of manufacture of the product of the invention, the several constituents are incorporated into a homogeneous product by a method which is considered a wet process.

In a typical procedure, the cellulose fiber constituent is prepared into an aqueous slurry into which are added the asphalt waterproofing sizing and expanded perlite; for example, with the fiber, asphalt, perlite and water being present in the proportions of about 1.00% fiber, 0.30% asphalt, 3.70% perlite and 95% water by weight. This slurry is then rendered into a more or less solid form by removal of the water constituent in a stationary drainage mold or on a drainage screen.

The product is then dried in an oven or other suitable dryer until essentially all moisture has been removed and then, if desired, may be ground up into a fluffy low density material.

In a dry process embodment wherein no aqueous slurry is used, the sizing material (for instance, the asphalt, silicone or the like) is applied as a spray or other suitable fine particles to an air conveyed mixture of the dry cellulose fibers and expanded perlite. This mixture is collected, formed and then expanded perlite. This mixture is collected, formed and then dried, if necessary.

In accordance with one illustrative method of manufacture, 30 parts newsprint fiber is mixed with 67 parts of perlite in an air mixing conveying system while simultaneously being sprayed with 3 parts of emulsified asphalt. This material is then collected, compacted slightly to the desired form, dried and packed as desired. Alternatively, the product of the dry process may be collected without any compaction and packaged without any grinding as a somewhat fluffy material typically weighing about 4 pounds per cubic foot.

Whether or not a wet process is more suitable under the circumstances to prepare the composition of the invention depends to some extent on the particular constituents selected. Satisfactory products may be prepared from either process.

There are several ways in which the product of the invention can be used effectively. The product of the invention can be allowed to float on the surface of the oil and water or the oil contaminated water can be allowed to pass through zones or devices (such as dams, filters, containers or other suitable physical shapes) whereon the oil will be sorbed and the water will pass through substantially free from oil. Thus, the oil contaminated liquids can be passed through fixed beds of the materials of this invention. When the material of this invention is spread on the surface of the oil contaminated water, it sorbs only oily material and then is skimmed from the water surface.

The composition of the invention has been cast on sea or fresh water in an area where oil spillage has occurred over a large surface of water. The product of the invention floats, gradually sorbing the oil until the composition becomes essentially saturated. The present composition is inert and does not disintegrate or sink.

In a different trial on a similarly affected sea water area, oil was rapidly sorbed on the particles even though the sea was quite choppy due to wind and current. In other experiments, the composition of the invention was used successfully on industrial oil settling ponds (industrial fresh water). A lake area contaminated with oil slick was also effectively purified.

After the present composition is deemed to have removed an adequate amount of oil from the surface, the floating particles are readily harvested as by scooping them up by suitable nets, rakes or other similar gathering devices. The composition of this invention can be used in any suitable way on oil polluted water to remove oil therefrom very effectively. The amount of oil which the particles will absorb markedly exceeds that of conventional materials. A mass of about 18 pounds of the present composition is observed to sorb from about 10 to 50 gallons of petroleum material from the surface of contaminated water. It is a characteristic of the product of the invention that one pound thereof is capable of absorbing about 0.5 to 2.8 gallons of petroleum material from the surface of petroleum contaminated water and still float on the surface of the contaminated water for an essentially indefinite period. The present composition sorbs the full gamut of petroleum products from light distillate to heavy crudes.

The oil saturated composition of the invention can be treated in various ways to recovering the oil, if desired, or the material can be disposed of in any suitable manner. The method of the invention can be effectuated in a wide range of temperatures. The time of contact of the product of the invention with the oil contaminate of water depends upon the type of oil to be sorbed and the degree of purification desired.

The material of the invention has been used with various types of oils floating on water surfaces. While the composition of the present invention is particularly adapted to sorbing, preferentially, petroleum fractions in the presence of water, it also effectively sorbs petroleum residues from solid substrates such as floors, benches and the like. Such is to be considered within the teachings of this invention.

Experiments were conducted to establish that the absorptive characteristics of a mixture of expanded volcanic glass and a cellulosic fiber are significantly greater than those of either expanded volcanic glass or cellulosic fiber in the unmixed state and that the results obtained by utilizing the mixed components of the present invention are synergistic to a surprising and unexpected degree.

These experiments were carried out as follows:

ASPHALT SIZED PERLITE

An asphalt sized perlite sorbent was prepared by mixing 509gm of commercially availble expanded perlite, 10,298ml of water and 56gm of a commercially available asphalt emulsion containing 60% solids. The pH was adjusted to 4.5 by adding alum, while mixing the material in a 5-gallon pail using a heavy duty electric stirrer. The slurry as then drained and the wet product dried until essentially all of the moisture had been removed. The dry product was then broken into loosely agglomerated particles, less than 1 inch in diameter.

ASPHALT SIZED FIBER

An asphalt sized fiber sorbent was prepared by mixing 509gm of repulped waste newsprint, 14,361ml of water and 56gm of the asphalt emulsion. The pH was adjusted to 4.5 using alum, and the mixed slurry drained, dried and then broken into loosely agglomerated particles with a commercial hammer mill. The product passed through a screen with 1" square holes.

PERLITE-FIBER SORBENT

A perlite-fiber sorbent in accord with the present invention was prepared by mixing a slurry of 108gm of the same repulped newsprint utilized above, 401gm of the same expanded perlite used above, 10,298ml or water and 56gm of the above asphalt emulsion. After adjusting the pH to 4.5 with alum, the mixed slurry was drained, dried and broken into particles with a commercial hammer mill. These particles also passed through the screen having 1" square holes.

SILICONE TREATED PERLITE

The silicone treated expanded perlite used was the commercially available material produced under U.S. Pat. No. 3,382,170 to Paper.

The oil sorption and retention of each of the compositions was tested by preparing an oil slick in a 7" + 7" square container. The container was partially filled with 2400ml of water and 500ml of SAE 50 motor oil was poured over the water to produce a layer of 0.62" thick oil on the top thereof. Twenty grams of one of the sorbents was spread on the oil and allowed to soak up the oil for 15 minutes. The test was repeated numerous times in order to obtain data for each of the sorbents. After soaking, each sorbent was removed from the test unit by means of a screen placed in the container prior to provision of the sorbent. The screen containing the sorbent was allowed to drain for 15 minutes and the sorbent discarded. The amount of oil sorbed was determined by measuring the amount of oil not sorbed and subtracting this amount from the original total amount of oil. The removal screens had ¼" and ⅛" openings, the latter being required to pick up the asphalt sized perlite and the silicone treated perlite.

Table I, shown as follows, details the results of the experimental work:

TABLE I

| Sorbent Type | Volume of Oil Retained by 20gm of Sorbent (ml.) | Calculated Oil Sorption in Gallons of Oil Per Pound of Sorbent |
|---|---|---|
| Asphalt-Sized Perlite-Fiber* | 392 | 2.35 |
| Asphalt-Sized Fiber | 191 | 1.15 |
| Asphalt-Sized Perlite | 315 | 1.89 |
| Silicone-Sized Perlite | 123 | 0.74 |

*By weight 19.9% Fiber, 73.9% Perlite, 6.2% Asphalt

As is apparent from the above-described data set forth in the table, there is significant improvement in the oil absorbing characteristics of the intimate mixture of the perlite and cellulosic fibers as opposed to either perlite or cellulosic fibers alone. The product of the present invention absorbed oil in the amount of 24% more than the best of the alternative compositions and the oil sorption of the combined materials was more than additive; that is, if the asphalt sized fiber and asphalt sized perlite were mixed 21.2 parts to 78.8 parts, respectively, a sorption rate of 1.73 gal/lb would be expected. As shown in Table I a sorption of 2.35 gal/lb was actually obtained, a 36% higher sorption rate than expected.

Although the reasons for the large difference in the effectiveness of the combined components as compared to the single materials are not clear, it appears that some interaction between the components and the oil produces these improved results.

What is claimed:

1. An oleospecific hydrophobic composition comprising an intimate mixture of expanded volcanic glass consisting of perlite, a cellulosic fiber, and a water repellent sizing consisting of asphalt, wherein said glass is present in an amount by weight of about 73.9% and has a particle size in the range of −8 to +400 mesh in which a major portion thereof passes through a 14 mesh screen and is retained on a 200 mesh screen and in which said fiber is present in an amount by weight of about 19.9% in which no more than about 35% of said fiber is −200 mesh, and water repellent sizing is applied to at least said fiber in an amount of about 6.2% by weight of said composition.

2. A method for sorbing oleaginous compounds comprising applying to the area where said oleaginous compounds are to be sorbed, an oleospecific hydrophobic composition comprising an intimate mixture of expanded volcanic glass consisting of perlite, and a cellulosic fiber wherein said glass is present in an amount by weight of about 73.9% and has a particle size in the range of −8 to +400 mesh in which a major portion thereof passes through a 14 mesh screen and is retained on a 200 mesh screen and in which said fiber is present in an amount by weight of about 19.9% in which no more than about 35% of said fiber is −200 mesh, and about 6.2 weight percent of asphalt as a sizing binder.

* * * * *